United States Patent
Park et al.

(10) Patent No.: US 11,720,506 B2
(45) Date of Patent: Aug. 8, 2023

(54) DEVICE AND METHOD FOR INSPECTING PROCESS, AND ELECTRONIC CONTROL DEVICE

(71) Applicant: MANDO CORPORATION, Pyeongtaek-si (KR)

(72) Inventors: Jong Gyu Park, Yongin-si (KR); Han-Sik Kim, Yongin-si (KR); Seung Gap Choi, Seongnam-si (KR)

(73) Assignee: HL Klemove Corp., Incheon (KR)

(*) Notice: Subject to any disclaimer, the term of this patent is extended or adjusted under 35 U.S.C. 154(b) by 157 days.

(21) Appl. No.: 17/342,125

(22) Filed: Jun. 8, 2021

(65) Prior Publication Data

US 2021/0382835 A1    Dec. 9, 2021

(30) Foreign Application Priority Data

Jun. 8, 2020 (KR) .................. 10-2020-0068776

(51) Int. Cl.
| | |
|---|---|
| *G06F 13/20* | (2006.01) |
| *G06F 13/42* | (2006.01) |
| *G06F 11/34* | (2006.01) |
| *G05B 23/02* | (2006.01) |
| *G06F 11/30* | (2006.01) |

(52) U.S. Cl.
CPC .......... *G06F 13/20* (2013.01); *G05B 23/0256* (2013.01); *G06F 11/3041* (2013.01); *G06F 11/349* (2013.01); *G06F 13/4282* (2013.01); *G06F 2213/0016* (2013.01)

(58) Field of Classification Search
CPC .......... G06F 13/20; G06F 13/42; G06F 11/30; G06F 11/34; G05B 23/42
See application file for complete search history.

(56) References Cited

U.S. PATENT DOCUMENTS

| | | | |
|---|---|---|---|
| 5,657,250 A * | 8/1997 | Park ................ | H04Q 3/54533 370/359 |
| 10,650,621 B1 * | 5/2020 | King ................ | H04L 67/12 |
| 10,749,680 B1 * | 8/2020 | Troia ............... | B60R 25/24 |
| 2014/0359179 A1 * | 12/2014 | Au .................. | G06F 13/42 710/106 |
| 2019/0108160 A1 * | 4/2019 | Otsuka ............. | G05B 9/02 |
| 2019/0316539 A1 * | 10/2019 | Prabhu ............. | F02D 41/266 |
| 2021/0056058 A1 * | 2/2021 | Lee ................. | G06F 13/4221 |
| 2021/0294893 A1 * | 9/2021 | Uddin .............. | G06F 21/70 |
| 2021/0392461 A1 * | 12/2021 | Cooper ............. | G07C 9/00309 |

* cited by examiner

*Primary Examiner* — Henry Tsai
*Assistant Examiner* — Christopher A Daley
(74) *Attorney, Agent, or Firm* — Morgan, Lewis & Bockius LLP

(57) ABSTRACT

The embodiments of the present disclosure relate to a device and method for inspecting process and an electronic control device. The device for inspecting process may include a converting controller configuring to be controlled for, when a preset operation is performed in a serial communication, converting into at least one process monitoring message by inputting a specific value into a dummy area included in at least one message corresponding to the preset operation, and an inspecting controller configuring to be controlled for inspecting a process based on the process monitoring message.

20 Claims, 11 Drawing Sheets

DEVICE AND METHOD FOR INSPECTING PROCESS, AND ELECTRONIC CONTROL DEVICE

CROSS REFERENCE TO RELATED APPLICATION

This application claims priority from Korean Patent Application No. 10-2020-0068776, filed on Jun. 8, 2020, which is hereby incorporated by reference for all purposes as if fully set forth herein.

TECHNICAL FIELD

An embodiment of the present disclosure relates to a device and method for inspecting process and an electronic control device.

BACKGROUND

In an autonomous driving vehicle, as user convenience functions are increased, the importance of ASIL-related activities for safely driving a vehicle is increasing very much. In particular, sensors used for the vehicles are playing a key role in autonomous vehicles.

In recent autonomous vehicles, the design of an electronic control device that controls the above-described functions and sensors occupies a very important weight. Accordingly, there is a need for a research capable of inspecting processes of an electronic control device in a recent autonomous vehicle.

SUMMARY

In this background, embodiments of the present disclosure provide a process inspection device capable of easily and efficiently inspecting or testing the process.

In addition, embodiments of the present disclosure provide a process inspection method capable of easily and efficiently inspecting or testing the process.

In addition, embodiments of the present disclosure provide an electronic control device capable of easily and efficiently inspecting or testing the process.

In an aspect of the present disclosure, there is provided a device for inspecting a process including a converting controller configuring to be controlled for, when a preset operation is performed in a serial communication, converting into at least one process monitoring message by inputting a specific value into a dummy area included in at least one message corresponding to the preset operation, and an inspecting controller configuring to be controlled for inspecting a process based on the process monitoring message.

In another aspect of the present disclosure, there is provided a method for inspecting a process including converting into at least one process monitoring message, when a preset operation is performed in a serial communication, by inputting a specific value into a dummy area included in at least one message corresponding to the preset operation, and inspecting a process based on the process monitoring message.

In another aspect of the present disclosure, there is provided an electronic control device including a peripheral, a controller connected to the peripheral through serial communication, and a process inspector for inspecting a process for at least one of the peripheral and the controller, wherein the process inspector configuring to, when a preset operation is performed in at least one of the peripheral and the controller, convert into at least one process monitoring message by inputting a specific value into a dummy area included in at least one message corresponding to the preset operation, and inspect the process based on the process monitoring message.

According to an embodiment of the present disclosure, it is possible to provide a process inspection device capable of easily and efficiently inspecting or testing the process.

In addition, according to an embodiment of the present disclosure, it is possible to provide a process inspection method capable of easily and efficiently inspecting or testing the process.

In addition, according to an embodiment of the present disclosure, it is possible to provide an electronic control device capable of easily and efficiently inspecting or testing the process.

DETAILED DESCRIPTION

Figure 1:
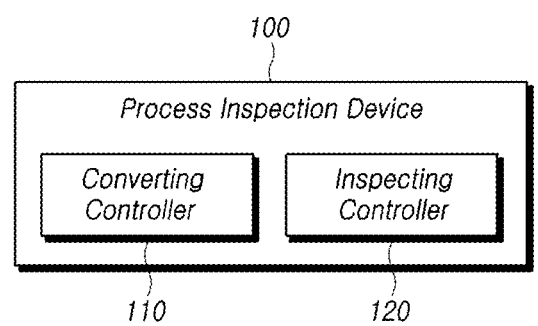
FIG. 1 is a block diagram illustrating a process inspection device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a process inspection device according to the present embodiments.

Referring to FIG. 1, a process inspection device 100 according to the present embodiments may include at least one of a converting controller 110 and an inspecting controller 120. In this specification, the converting controller 110 and the inspecting controller 120 may be also referred as a conversion unit and an inspection unit, respectively. The converting controller 110 and the inspecting controller 120 may be connected by at least one of electrical means, magnetic means and mechanical means. The converting controller 110 and the inspecting controller 120 may be one or a plurality.

In serial communication, when a preset operation is performed, the process inspection device 100 according to the present embodiments may include the converting controller 110 configuring to be controlled for, when a preset operation is performed in a serial communication, converting into at least one process monitoring message by inputting a specific value into a dummy area included in at least one message corresponding to the preset operation, and the inspecting controller 120 configuring to be controlled for inspecting a process based on the process monitoring message.

Here, the serial communication may include at least one of SPI (Serial Peripheral Interface) communication and I2C (Inter Integrated Circuit) communication. However it is not limited thereto, it may include any communication capable of being communicated in serial.

Here, the preset operation may include at least one of a read operation and a verification and read operation.

Here, the at least one message may include at least one of a read message and a verification read message.

Here, the dummy area may be an area in which dummy data exists. The dummy area may be referred to as a dummy space or a dummy field. In particular, dummy data may mean docile information that does not contain useful data, but is treated actual data as if it is nominally present.

Specifically, when a read operation or a verification read operation is performed in at least one of SPI (Serial Peripheral Interface) communication and I2C (Inter Integrated Circuit) communication, the converting controller 110 may convert or generate at least one message.

In an example, when a read operation is performed in at least one of the SPI communication and the I2C communication, the converting controller 110 may generate or convert into at least one process monitoring message by inputting a process monitoring value into the data area included in at least one read message corresponding to the read operation.

In another example, when a verification operation through a read operation is performed after performing a write operation in at least one of the SPI communication and the I2C communication, the converting controller 110 may generate or convert into at least one process monitoring message by inputting a process monitoring value into the data area included in at least one verification read message corresponding to the verification operation through a read operation after performing a write operation.

Here, the process monitoring value may be a value capable of monitoring the process, and may include any value that can be used to monitor the process.

The inspecting controller 120 may receive a process monitoring message from the converting controller 110. The inspecting controller 120 may inspect the process based on the process monitoring message.

Specifically, the inspecting controller 120 may monitor the process monitoring message, and inspect a process flow by comparing a monitoring result of the process monitoring message with a preset process flow.

That is, the inspecting controller 120 may monitor the process monitoring message periodically, or in real time, or at any time point, and compare whether the monitoring result of the process monitoring message is consistent with a preset process flow.

If the monitoring result of the process monitoring message is consistent with the preset process flow, the inspecting controller 120 may determine that the current process flow is in a normal state.

If the monitoring result of the process monitoring message is not consistent with the preset process flow, the inspecting controller 120 may determine that the current process flow is in an abnormal state.

For example, the inspecting controller 120 may monitor at least one of a period value, a counting value, and a question and answer value of a process monitoring message, and check the process flow by comparing whether the monitoring result (or monitoring value) of at least one of the period value, the counting value and the question and answer value of a process monitoring message matches the preset process flow.

In one example, the inspecting controller 120 may monitor that the process monitoring message is periodically stored, received, and/or transmitted. The inspecting controller 120 may compare periodically stored, received, and/or transmitted process monitoring messages (hereinafter, periodic values of the process monitoring messages) with the preset process flow. As result of the comparison, if the period value of the process monitoring message matches the preset period value, the inspecting controller 120 may determine that the current process flow is in a normal state, and if the periodic value of the process monitoring message does not match the preset periodic value, the inspecting controller 120 may determine that the current process flow is in an abnormal state.

In another example, the inspecting controller 120 may monitor a counting value by counting that the process monitoring message is stored, received, and/or transmitted. The inspecting controller 120 may compare whether the counting value at which the process monitoring message is stored, received and/or transmitted (hereinafter, the counting value of the process monitoring message) is consistent with the preset process flow. As result of the comparison, if the counting value of the process monitoring message matches the preset counting value, the inspecting controller 120 may determine that the current process flow is in a normal state, and if the counting value of the process monitoring message does not match the preset counting value, the inspecting controller 120 may determine that the current process flow is in an abnormal state.

In another example, the inspecting controller 120 may monitor the query and response values by performing a question and answer for the process monitoring message. The inspecting controller 120 may compare whether the query and response values of the process monitoring message matches the preset process flow. As result of the comparison, if the query and response values of the monitoring message match the preset query and response values, the inspecting controller 120 may determine that the current process flow is in a normal state, and if the query and response values of the monitoring message do not match the preset query and response values, the inspecting controller 120 may determine that the current process flow is in an abnormal state.

In the case that it is determined that the current process flow is in a normal state, the inspecting controller 120 may generate a message (or a signal, etc.) corresponding to that the current process flow is in a normal state. Here, the message (or signal, etc.) corresponding to the current process flow in a normal state may be a clear message (or signal, etc.), that is, a message (or a signal, etc.) to prevent reset.

If it is determined that the current process flow is in a abnormal state, the inspecting controller 120 may generate a message (or a signal, etc.) corresponding to that the current process flow is in an abnormal state. Here, the message (or signal, etc.) corresponding to the current process flow in an abnormal state may be a reset message (or signal).

Figure 2:
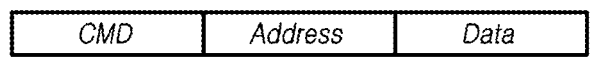
FIG. 2 is a diagram for explaining a message according to the present embodiments.

FIG. 2 is a diagram for explaining a message according to the present embodiments.

Referring to FIG. 2, a message according to the present embodiments may include a CMD area, an address area, and a data area. Here, the data area may be a dummy area.

In the case that the read operation is performed in at least one of SPI (Serial Peripheral Interface) communication and I2C (Inter Integrated Circuit) communication, the converting controller 110 may generate or convert into at least one process monitoring message by inputting a process monitoring value into the data area included in at least one read message corresponding to the read operation.

Alternatively, when a verification operation through a read operation is performed after performing a write operation in at least one of the SPI communication and the I2C communication, the converting controller 110 may generate or convert into at least one process monitoring message by inputting a process monitoring value into the data area included in at least one verification read message corresponding to the verification operation through a read operation after performing a write operation.

Since the configuration of the converting controller 110 and the inspecting controller 120 described above in FIG. 1 can also be applied to FIG. 2, for simplicity of explanation, it will be omitted the contents overlapping with the contents of the converting controller 110 and the inspecting controller 120 described above in FIG. 1.

Hereinafter, a process inspection method according to the present embodiments will be described with reference to the accompanying drawings. The process inspection method according to the present embodiments may be performed through a process inspection device. Accordingly, it will be omitted the contents overlapping with the process inspection device according to the present exemplary embodiments described above with reference to FIGS. 1 and 2 for simplicity of description.

Figure 3:
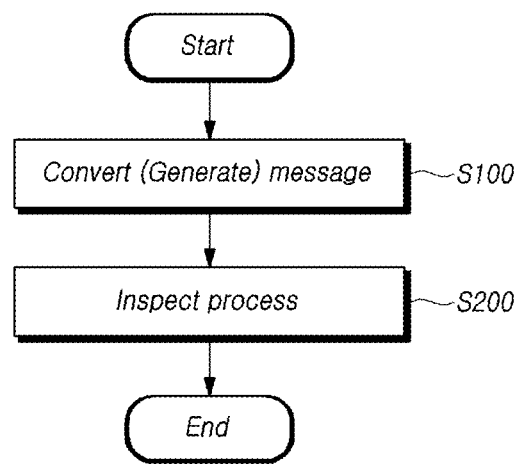
FIG. 3 is a flowchart illustrating a process inspection method according to the present embodiments.

FIG. 3 is a flowchart illustrating a process inspection method according to the present embodiments.

Referring to FIG. 3, a process inspection method according to the present embodiments may include at least one of a message converting step (S100) and a process inspecting step (S200).

The process inspection method according to the present embodiments may include a step of converting into at least one process monitoring message, when a preset operation is performed in a serial communication, by inputting a specific value into a dummy area included in at least one message corresponding to the preset operation (S100), and a step of inspecting a process based on the process monitoring message (S200).

Specifically, first, when a preset operation is performed in the serial communication, at least one process monitoring message may be generated by inputting a process monitoring value into the data area included in at least one read message corresponding to the preset operation (S100).

Here, the serial communication may include at least one of a serial peripheral interface (SPI) communication and an inter-integrated circuit (I2C) communication.

In S100, when a read operation is performed in at least one of the SPI communication and the I2C communication, at least one process monitoring message may be generated by inputting a process monitoring value into a read dummy area included in at least one read message corresponding to the read operation.

Alternatively, in step S100, when a verification operation through a read operation is performed after performing a write operation in at least one of the SPI communication and the I2C communication, at least one process monitoring message may be generated by inputting a process monitoring value into a verification read dummy space included in at least one verification read message corresponding to the verification operation through a read operation after performing a write operation.

Here, the at least one message may include a CMD area, an address area and a data area, and the data area may be the dummy area.

In S100, when the read operation is performed in at least one of the SPI communication and the I2C communication, at least one process monitoring message may be generated by inputting a process monitoring value into the data area included in at least one read message corresponding to the read operation.

Alternatively, in step S100, when a verification operation through a read operation is performed after performing a write operation in at least one of the SPI communication and the I2C communication, at least one process monitoring message may be generated by inputting a process monitoring value into the data area included in at least one verification read message corresponding to the verification operation through a read operation after performing a write operation.

Thereafter, the process may be inspected based on the process monitoring message of step S100 (S200).

For example, in step S200, a process monitoring message may be monitored, and a process flow may be inspected by comparing a monitoring result of the process monitoring message with a preset process flow.

That is, in step S200, at least one of a periodic value, a counting value, and a question and answer value of the process monitoring message may be monitored. And, the process flow may be inspected by comparing whether the monitoring result of at least one of the periodic value, the counting value, and the question and answer value of the process monitoring message matches a preset process flow.

Hereinafter, it will be described an electronic control device according to the present embodiments with reference to the accompanying drawings. Hereinafter, it will be omitted the contents overlapping with the process inspection device and the process inspection method according to the exemplary embodiments described above with reference to FIGS. 1 to 3 for simplicity of description.

Figure 4:
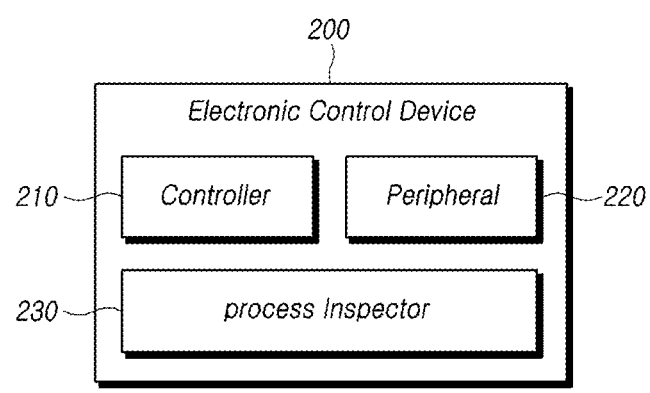
FIGS. 4 and 5 are block diagrams illustrating an electronic control device according to the present embodiments.
Figure 5:
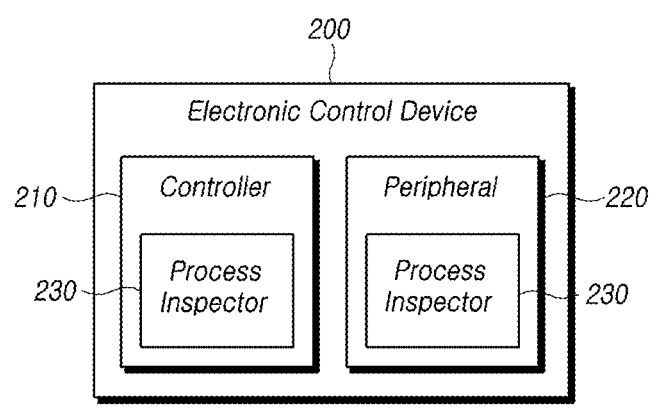

FIGS. 4 and 5 are block diagrams illustrating an electronic control device according to the present embodiments.

Referring to FIGS. 4 and 5, the electronic control device 200 according to the present embodiments may include at least one of a controller 210, a peripheral 220, and a process inspector 230. In this specification, the controller 210, the peripheral 220, and the process inspector 230 may also be referred as a control unit, a peripheral unit and a process inspection unit, respectively. The controller 210, the peripheral 220 and the process inspector 230 may be connected by at least one of electrical means, magnetic means, and mechanical means. The controller 210, the peripheral 220 and the process inspector 230 may be one or a plurality, respectively.

The process inspector 230 may be not included in the controller 210 and the peripheral 220, and may be provided separately, but is not limited thereto, or may be provided within the controller 210 and the peripheral 220.

The controller 210, the peripheral 220 and the process inspector 230 may be connected to each other through serial communication.

The electronic control device 200 may include an electronic control unit (ECU), but is not limited thereto and may include any control device (or system) as long as it is a device (or system) capable of being electronically controlled.

Since the process inspector 230 may be understood as the same component as the process inspection device 100 described above with reference to FIGS. 1 to 3, and, for simplicity of description, it will be omitted the contents overlapping with the process inspection device 100 described above with reference to FIGS. 1 to 3.

Referring to FIG. 4, in the electronic control device 200 according to the present embodiments, the process inspector 230 may be not included in the controller 210 and the peripheral 220, but may be provided separately.

That is, the electronic control device 200 according to the present embodiments may include a peripheral 220, a controller 210 connected to the peripheral 220 through serial communication, and a process inspector 230 for inspecting a process for at least one of the peripheral 220 and the controller 210. Here, the process inspector 230 may, when a preset operation is performed in at least one of the peripheral 220 and the controller 210, generate or convert into at least one process monitoring message by inputting a specific value into a dummy area included in at least one message corresponding to the preset operation, and may inspect the process based on the process monitoring message.

Here, the serial communication may include at least one of a serial peripheral interface (SPI) communication and an inter-integrated circuit (I2C) communication When a read operation is performed in at least one of the SPI communication and the I2C communication, the process inspector 230 may generate or convert into at least one process monitoring message by inputting a process monitoring value into a read dummy area included in at least one read message corresponding to the read operation.

Alternatively, when a verification operation through a read operation is performed after performing a write operation in at least one of the SPI communication and the I2C communication, the process inspector 230 may generate or convert into at least one process monitoring message by inputting a process monitoring value into a verification read dummy space included in at least one verification read message corresponding to the verification operation through a read operation after performing a write operation.

Here, the at least one message may include a CMD area, an address area and a data area, and the data area may be the dummy area.

When a read operation is performed in at least one of the SPI communication and the I2C communication, the process inspector 230 may generate or convert into at least one process monitoring message by inputting a process monitoring value into the data area included in at least one read message corresponding to the read operation.

Alternatively, when a verification operation through a read operation is performed after performing a write operation in at least one of the SPI communication and the I2C communication, the process inspector 230 may generate or convert into at least one process monitoring message by inputting a process monitoring value into the data area included in at least one verification read message corresponding to the verification operation through a read operation after performing a write operation.

The process inspector 230 may monitor the process monitoring message, and may inspect a process flow by comparing a monitoring result of the process monitoring message with a preset process flow.

The process inspector 230 may monitor at least one of a period value, a counting value, and a question and answer value of the process monitoring message, and may inspect the process flow by comparing whether a monitoring result of at least one of the period value, the counting value and the question and answer value of the process monitoring message matches a preset process flow.

Referring to FIG. 5, in the electronic control device 200 according to the present embodiments, a process inspector 230 may be provided in the controller 210 and the peripheral 220. Accordingly, the function of the process inspector 230 may be performed within the controller 210 and the peripheral 220.

The electronic control device 200 according to the present embodiments may include the peripheral 220 and the controller 210 connected to the peripheral 220 through serial communication. At least one of the peripheral 220 and the controller 210 may, when a preset operation is performed, generated or convert into at least one process monitoring message by inputting a specific value into a dummy area included in at least one message corresponding to the preset operation, and may inspect the process based on the process monitoring message.

Here, the serial communication may include at least one of a serial peripheral interface (SPI) communication and an inter-integrated circuit (I2C) communication.

At least one of the peripheral 220 and the controller 210 may, when a read operation is performed in at least one of the SPI communication and the I2C communication, generate or convert into at least one process monitoring message by inputting a process monitoring value into a read dummy area included in at least one read message corresponding to the read operation.

Alternatively, when a verification operation through a read operation is performed after performing a write operation in at least one of the SPI communication and the I2C communication, at least one of the peripheral 220 and the controller 210 may generate or convert into at least one process monitoring message by inputting a process monitoring value into a verification read dummy space included in at least one verification read message corresponding to the verification operation through a read operation after performing a write operation.

Here, the at least one message may include a CMD area, an address area and a data area, and the data area may be the dummy area.

At least one of the peripheral 220 and the controller 210 may, when a read operation is performed in at least one of the SPI communication and the I2C communication, generate or convert into at least one process monitoring message by inputting a process monitoring value into the data area included in at least one read message corresponding to the read operation.

Alternatively, when a verification operation through a read operation is performed after performing a write operation in at least one of the SPI communication and the I2C communication, at least one of the peripheral 220 and the controller 210 may generate or convert into at least one process monitoring message by inputting a process monitoring value into the data area included in at least one verification read message corresponding to the verification operation through a read operation after performing a write operation.

At least one of the peripheral 220 and the controller 210 may monitor the process monitoring message, and may inspect a process flow by comparing a monitoring result of the process monitoring message with a preset process flow.

At least one of the peripheral 220 and the controller 210 may monitor at least one of a period value, a counting value, and a question and answer value of the process monitoring message, and may inspect the process flow by comparing whether a monitoring result of at least one of the period value, the counting value and the question and answer value of the process monitoring message matches a preset process flow.

Figure 6:
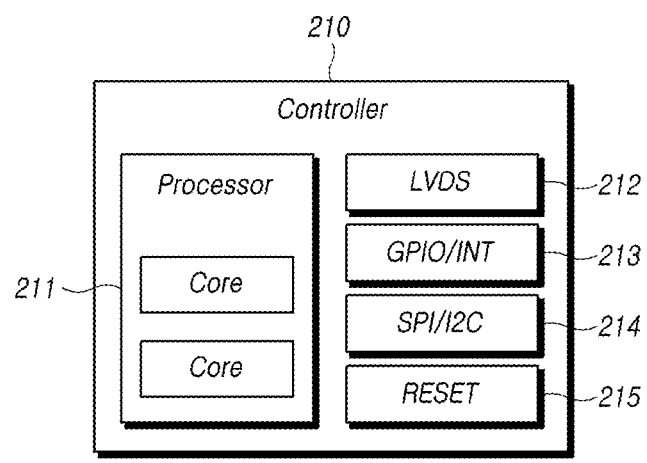
FIG. 6 is a block diagram illustrating a controller according to the present embodiments.

FIG. 6 is a block diagram illustrating a controller according to the present embodiments.

Referring to FIG. 6, the controller 210 according to the present embodiments may include a microcontroller unit (MCU), but is not limited thereto, and may include any unit as long as it is a unit capable of performing a computing function.

The controller 210 may include at least one of a processor 211, a low voltage differential signaling (LVDS) 212, a general purpose input-output (GPIO/INT) 213, a SPI/I2C 214, and a RESET 215. The processor 211, LVDS 212, GPIO/INT 213, SPI/I2C 214, and RESET 215 may be connected by at least one of electrical means, magnetic means, and mechanical means. The processor 211, LVDS 212, GPIO/INT 213, SPI/I2C 214, and RESET 215 may be one or a plurality, respectively.

Here, the processor 211 may include at least one core. In particular, in the case that there is a plurality of cores, at least one of the plurality of cores may include a lockstep core.

Figure 7:
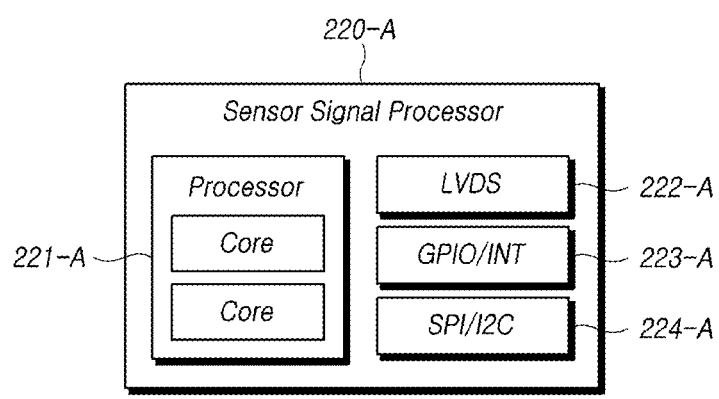
FIGS. 7 and 8 are block diagrams illustrating a peripheral according to the present embodiments.
Figure 8:
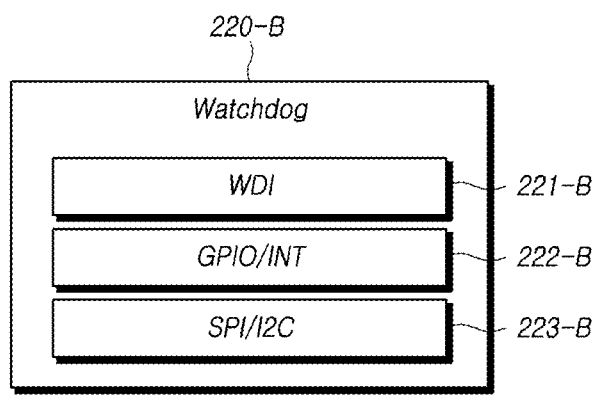

FIGS. 7 and 8 are block diagrams illustrating a peripheral according to the present embodiments.

Referring to FIGS. 7 and 8, a peripheral 220 according to the present embodiments may include at least one of a Sensor Signal Processor 220-A and a watchdog 220-B. The Sensor Signal Processor 220-A and the watchdog 220-B may be connected by at least one of electrical means, magnetic means, and mechanical means. The Sensor Signal Processor 220-A and the watchdog 220-B may be one or a plurality, respectively.

Referring to FIG. 7, the Sensor Signal Processor 220-A may include a microcontroller unit (MCU) capable of processing a sensor signal, but is not limited thereto, and may include any unit capable of performing a computing function.

The Sensor Signal Processor 220-A may include at least one of a processor 221-A, a low voltage differential signaling (LVDS) 222-A, a general purpose input-output (GPIO/INT) 223-A, and a SPI/I2C 224-A. The processor 221-A, LVDS 222-A, GPIO/INT 223-A and SPI/I2C 224-A may be connected by at least one of electrical means, magnetic means, and mechanical means. The processor 221-A, LVDS 222-A, GPIO/INT 223-A and SPI/I2C 224-A may be one or a plurality, respectively.

Here, the processor 221-A may include at least one core. In particular, in the case that there is a plurality of cores, at least one of the plurality of cores may include a lockstep core.

Referring to FIG. 8, the watchdog 220-B may include at least one of a watchdog input (WDI) 221-B, a general purpose input-output (GIPO/INT) 222-B, and a SPI/I2C 223-B. The WDI 221-B, GPIO/INT 222-B and SPI/I2C 223-B may be connected by at least one of electrical means, magnetic means and mechanical means. The WDI 221-B, GPIO/INT 222-B and SPI/I2C 223-B may be one or a plurality, respectively.

Figure 9:
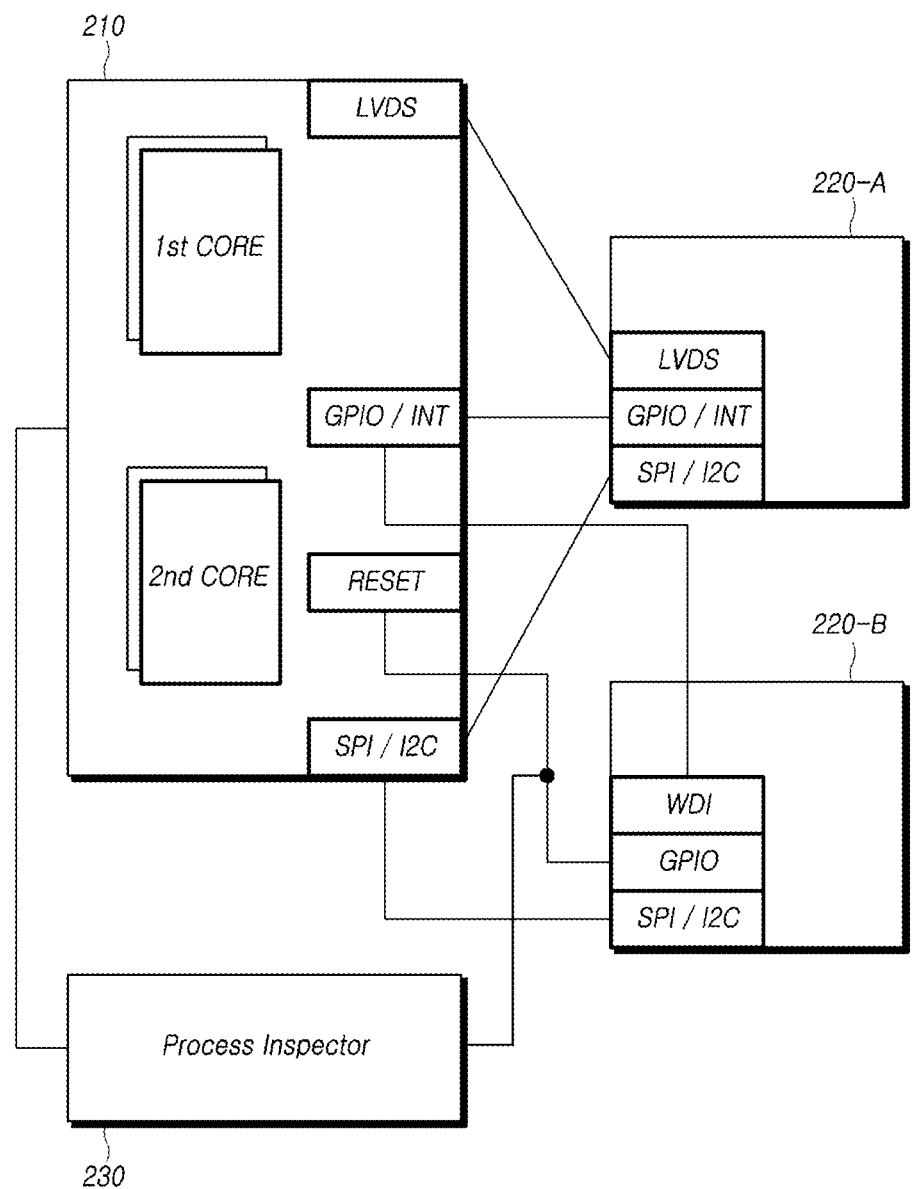
FIG. 9 is a diagram for explaining an electronic control device according to the present embodiments.

FIG. 9 is a diagram for explaining an electronic control device according to the present embodiments.

Referring to FIG. 9, an electronic control device 200 according to the present embodiments may include a controller 210, a Sensor Signal Processor 220-A, a watchdog 220-B and a process inspector 230.

The controller 210 may be an MCU, the Sensor Signal Processor 220-A may be a safety MCU, and the watchdog 220-B may be an external WD.

The controller 210 may control the operation of the Sensor Signal Processor 220-A, and the watchdog 220-B may reset the controller 210 if the controller 210 is in an abnormal state. The process inspector 230 may monitor a process flow of the controller 210, the Sensor Signal Processor 220-A and the watchdog 220-B.

The sensor may include at least one of a camera sensor, a radar sensor, a lidar sensor, and an ultrasonic sensor, but is not limited thereto, and may include any other sensors (e.g., sensors that can be applied in a vehicle).

The LVDS of the controller 210 and the LVDS of the Sensor Signal Processor 220-A may be connected to each other, and data may be transmitted from the LVDS of the Sensor Signal Processor 220-A to the LVDS of the controller 210. The GPIO/INT of the controller 210 and the GPIO/INT of the Sensor Signal Processor 220-A may be connected to each other, and the status information may be transmitted from the GPIO/INT of the Sensor Signal Processor 220-A to the GPIO/INT of the controller 210. The WDI of the watchdog 220-B and the GPIO/INT of the controller 210 may be connected to each other, and the watchdog clock signal may be transmitted from the GPIO/INT of the controller 210 to the WDI of the watchdog 220-B. The reset of the controller 210 and the GPIO of the watchdog 220-B may be connected to each other, and the GPIO of the watchdog 220-B may be a reset generation, and a reset signal may be transmitted from the GPIO of the watchdog 220-B to a reset of the controller 210. The controller 210, the Sensor Signal Processor 220-A, the watchdog 220-B, and the process inspector 230 may be connected to each other through SPI/I2C. The process inspector 230 may monitor the status of the controller 210, the Sensor Signal Processor 220-A, and the watchdog 220-B through SPI/I2C, and may generate a reset signal based thereon.

In particular, the electronic control device 200 according to the present embodiments may be a vehicle safety electronic control system.

The controller 210 may be an MCU having a lockstep core, that is, a lockstep structure. In addition, the Sensor Signal Processor 220-A is a device that communicates with the controller 210 through SPI and I2C, and may be a safety MCU that processes a signal from at least one of a camera sensor, a radar sensor, a lidar sensor, and an ultrasonic sensor.

The watchdog 220-B may be provided outside the controller 210 to wake up the internal function stop phenomenon of the controller 210. In addition, the controller 210 may include an independent safety function block therein to manage an internal function stop phenomenon. This independent safety function block may perform the function of the program inspection unit.

The watchdog 220-B may communicate with the controller 210 through SPI/I2C. In addition, the controller 210 and the Sensor Signal Processor 220-A may perform a write and/or read operation through SPI/I2C. In addition, when a write operation is performed through SPI/I2C, the controller 210 and the Sensor Signal Processor 220-A may perform an operation of verifying a write operation and contents through a read operation.

When performing a read operation after a read operation and/or a write operation through SPI/I2C, the controller 210 and the Sensor Signal Processor 220-A may input a specific message in a read dummy.

The electronic control device 200 according to the present embodiments may further include an external device (e.g., a program monitoring unit) capable of analyzing serial data (e.g., data containing a specific message in a read dummy), and may inspect whether to match a predefined process flow.

In the electronic control device 200 according to the present embodiments, the controller 210 and the Sensor Signal Processor 220-A may perform a function to analyze serial data (for example, data containing a specific message in a read dummy), and may inspect whether to match a predefined process flow.

In the electronic control device 200 according to the present embodiments, the controller 210 may include an independent comparison operation unit therein to check status information (e.g., a message including a specific message in a read dummy). In addition, the controller 210 of the electronic control device 200 according to the present embodiments may record status information (for example, a message containing a specific message in a read dummy) in a designated memory space by an internal independent comparison operation unit.

Figure 10:
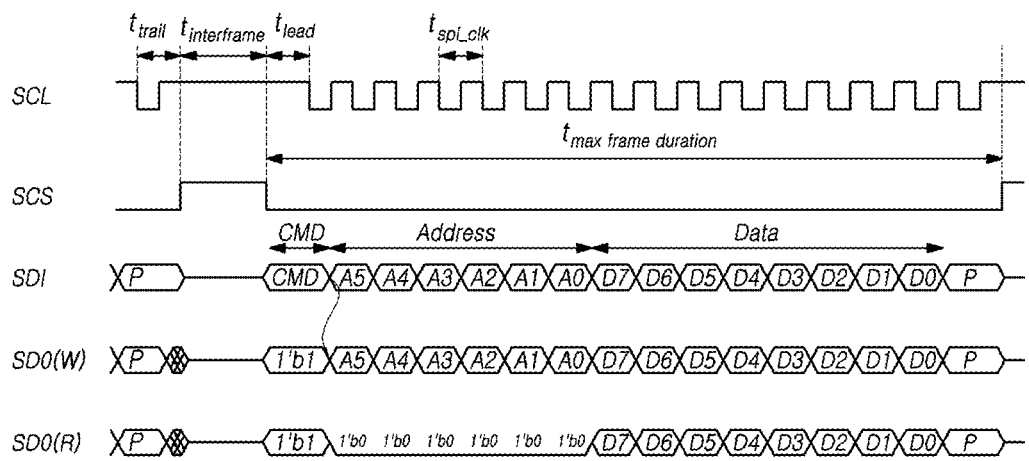
FIG. 10 is a diagram for explaining the timing of the electronic control device according to the present embodiments.

FIG. 10 is a diagram for explaining the timing of the electronic control device according to the present embodiments.

Referring to FIG. 10, a control unit and a peripheral unit according to the present embodiments may perform a read operation according to the timing diagram shown in the drawing.

The read message may include a CMD area, an address area, and a data area.

TABLE 1

| CMD | "00" | "11" |
|---|---|---|
| Function | Read | Write |

Referring to Table 1, in the CMD area, "00" may mean a read, and "11" may mean a write.

TABLE 2

|  | CMD | Address | Data |
|---|---|---|---|
| SDI | 0b00 | 0b111110 | 0xFF |
| SDO | 0b11 | 0b000000 | 0xAA |

TABLE 3

| Address | Data |
|---|---|
| 0b111111 | 0xAB |
| 0b111110 | 0XAA |
| 0b111101 | 0xFF |
|  | ** |
|  | ** |
|  | ** |
| 0b000010 | 0x15 |
| 0b000001 | 0x37 |
| 0b000000 | 0x39 |

Referring to Tables 2 and 3, the data area may be a read dummy area, and a specific value (for example, 0xFF, 0xAA, etc.) may be input in the data area which is a read dummy area, and this specific value can be any value.

Tables 1 to 3 described above are only examples and can be modified and implemented.

The electronic control device according to the present embodiments may input a value capable of monitoring the process flow of the MCU into the data area of the SDI during a read operation, and may perform monitoring in an external device (e.g., a process monitoring unit) and/or an independent module inside an MCU (e.g., a peripheral unit).

As described above, the process inspection device and method, the electronic control device according to the present embodiments may, in serial communication, input a specific value into a dummy area included in at least one message, and may generate at least one process monitoring message to inspect the process based on the process monitoring message. Therefore, in comparison with the conventional method of monitoring externally of the electronic control device through a debug port or a special port to monitor the internal operation of the MCU, by utilizing the characteristics of serial communication (e.g., SPI and I2C communication, etc.) which is often used to control peripheral devices (for example, sensors, etc.), it is possible to inspect the processes inside the electronic control device without using a debug port outside the electronic control device while using less additional resources. In addition, since it is possible to easily create an independent monitoring means to inspect the process, it is not only possible to easily debug the MCU internal process flow, but also possible to facilitate the development of a monitor module for the MCU internal process flow.

In addition, the electronic control device according to the present embodiments may include a watchdog and a process monitoring unit to inspect a process flow, thereby implementing an electronic control system having a redundant structure.

Figure 11:
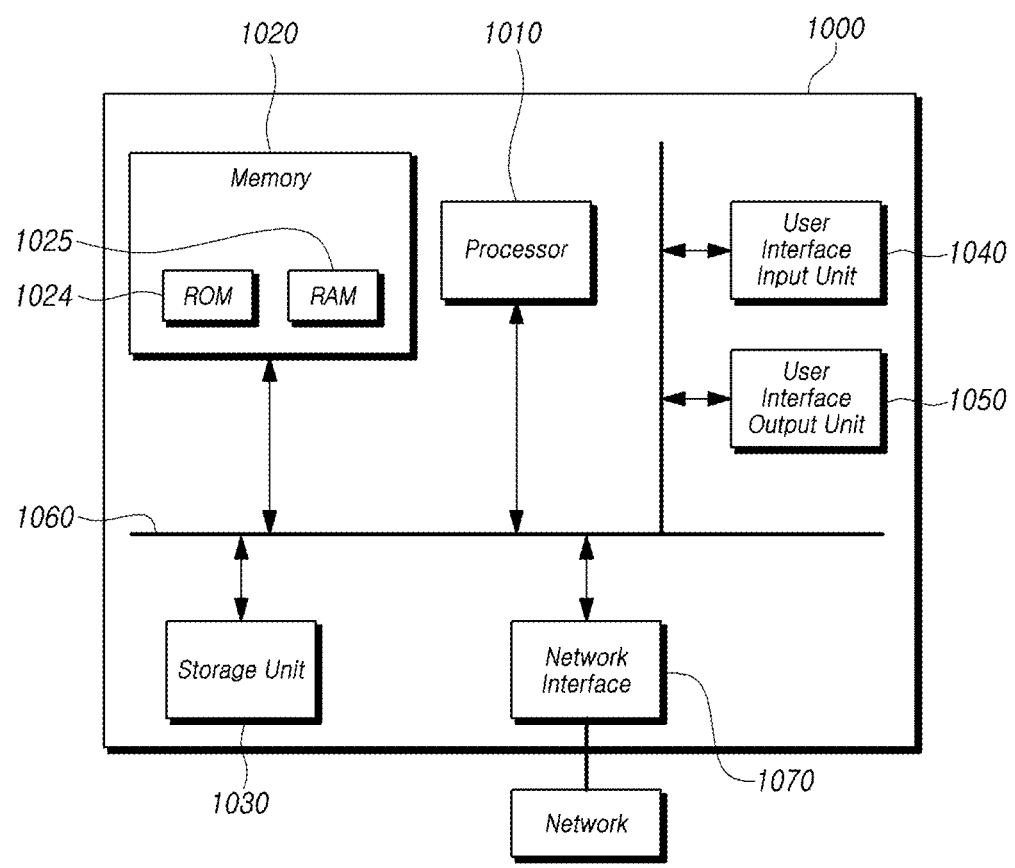
FIG. 11 is a block diagram of a computer system of a process inspection device and an electronic control device according to the present embodiments.

FIG. 11 is a block diagram of a computer system of a process inspection device and an electronic control device according to the present embodiments.

Referring to FIG. 11, the embodiments described above may be implemented in a computer system, for example, as a computer-readable recording medium. As shown in FIG. 11, a computer system 1000 such as a process inspection device and an electronic control device may include at least one or more elements of at least one processor 1010, a memory 1020, a storage unit 1030, a user interface input unit 1040, and a user interface output unit 1050, and these elements may communicate with each other through the bus 1060. In addition, computer system 1000 may also include a network interface 1070 for connecting to a network. The processor 1010 may be a CPU or semiconductor device that executes processing instructions stored in the memory 1020 and/or the storage unit 1030. The memory 1020 and the storage unit 1030 may include various types of volatile/nonvolatile storage media. For example, the memory may include ROM 1024 and RAM 1025.

Accordingly, the embodiments may be implemented as a computer-implemented method or a nonvolatile computer recording medium in which computer executable instructions are stored. In the case that the instructions are executed by a processor, a method according to at least one embodiment of the present embodiments may be performed.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for inspecting a process comprising:
   a converting controller configuring to be controlled for, when a preset operation is performed in a serial communication, converting into at least one process monitoring message by inputting a specific value into a dummy area included in at least one message corresponding to the preset operation; and
   an inspecting controller configuring to be controlled for inspecting a process based on the process monitoring message.

2. The device for inspecting a process of claim 1, wherein the serial communication includes at least one of a serial peripheral interface (SPI) communication and an inter-integrated circuit (I2C) communication.

3. The device for inspecting a process of claim 2, wherein the at least one message includes a CMD area, an address area and a data area, and the data area is the dummy area.

4. The device for inspecting a process of claim 3, wherein, when a read operation is performed in at least one of the SPI communication and the I2C communication, the converting controller converts into at least one process monitoring message by inputting a process monitoring value into the data area included in at least one read message corresponding to the read operation.

5. The device for inspecting a process of claim 3, wherein, when a verification operation through a read operation is performed after performing a write operation in at least one of the SPI communication and the I2C communication, the converting controller converts into at least one process monitoring message by inputting a process monitoring value into the data area included in at least one verification read message corresponding to the verification operation through a read operation after performing a write operation.

6. The device for inspecting a process of claim 1, wherein the inspecting controller monitors the process monitoring message, and inspects a process flow by comparing a monitoring result of the process monitoring message with a preset process flow.

7. The device for inspecting a process of claim 6, wherein the inspecting controller monitors at least one of a period value, a counting value, and a question and answer value of the process monitoring message, and inspects the process flow by comparing whether a monitoring result of at least one of the period value, the counting value and the question and answer value of the process monitoring message matches a preset process flow.

8. A method for inspecting a process comprising:
   converting into at least one process monitoring message, when a preset operation is performed in a serial communication, by inputting a specific value into a dummy area included in at least one message corresponding to the preset operation; and
   inspecting a process based on the process monitoring message.

9. The method for inspecting a process of claim 8, wherein the serial communication includes at least one of a serial peripheral interface (SPI) communication and an inter-integrated circuit (I2C) communication.

10. The method for inspecting a process of claim 9, wherein the at least one message includes a CMD area, an address area and a data area, and the data area is the dummy area.

11. The method for inspecting a process of claim 10, wherein the converting into at least one process monitoring message comprises, when a read operation is performed in at least one of the SPI communication and the I2C communication, converting into at least one process monitoring message by inputting a process monitoring value into the data area included in at least one read message corresponding to the read operation.

12. The method for inspecting a process of claim 10, wherein the converting into at least one process monitoring message comprises, when a verification operation through a read operation is performed after performing a write operation in at least one of the SPI communication and the I2C communication, converting into at least one process monitoring message by inputting a process monitoring value into the data area included in at least one verification read message corresponding to the verification operation through a read operation after performing a write operation.

13. The method for inspecting a process of claim 8, wherein the inspecting of the process comprises monitoring the process monitoring message, and inspecting a process flow by comparing a monitoring result of the process monitoring message with a preset process flow.

14. The method for inspecting a process of claim 13, wherein the inspecting of the process comprises monitoring at least one of a period value, a counting value, and a question and answer value of the process monitoring message, and inspecting the process flow by comparing whether a monitoring result of at least one of the period value, the counting value and the question and answer value of the process monitoring message matches a preset process flow.

15. An electronic control device comprising:
a peripheral;
a controller connected to the peripheral through serial communication; and
a process inspector for inspecting a process for at least one of the peripheral and the controller,
wherein the process inspector configuring to, when a preset operation is performed in at least one of the peripheral and the controller, convert into at least one process monitoring message by inputting a specific value into a dummy area included in at least one message corresponding to the preset operation, and inspect the process based on the process monitoring message.

16. The electronic control device of claim 15, wherein the serial communication includes at least one of a serial peripheral interface (SPI) communication and an inter-integrated circuit (I2C) communication.

17. The electronic control device of claim 16, wherein the at least one message includes a CMD area, an address area and a data area, and the data area is the dummy area.

18. The electronic control device of claim 17, wherein, when a read operation is performed in at least one of the SPI communication and the I2C communication, the process inspector converts into at least one process monitoring message by inputting a process monitoring value into the data area included in at least one read message corresponding to the read operation.

19. The electronic control device of claim 17, wherein, when a verification operation through a read operation is performed after performing a write operation in at least one of the SPI communication and the I2C communication, the process inspector converts into at least one process monitoring message by inputting a process monitoring value into the data area included in at least one verification read message corresponding to the verification operation through a read operation after performing a write operation.

20. The electronic control device of claim 15, wherein the process inspector is provided in the controller and the peripheral, or is provided separately.

\* \* \* \* \*